United States Patent [19]

Parrott

[11] Patent Number: 4,798,666
[45] Date of Patent: Jan. 17, 1989

[54] HYDROCRACKING CATALYST FOR MIDDLE DISTILLATES

[75] Inventor: Stephen L. Parrott, Bartlesville, Okla.

[73] Assignee: Phillips Petroleum Company, Bartlesville, Okla.

[21] Appl. No.: 109,641

[22] Filed: Oct. 15, 1987

Related U.S. Application Data

[63] Continuation-in-part of Ser. No. 763,592, Aug. 8, 1985, Pat. No. 4,720,472.

[51] Int. Cl.$^4$ ............................................. C10G 47/20
[52] U.S. Cl. ..................................... 208/111; 208/112
[58] Field of Search ............... 208/111, 112, 216 R, 208/217, 114; 502/171, 220, 221, 242, 255

[56] References Cited

U.S. PATENT DOCUMENTS

| Re. 29,771 | 9/1978 | Cull et al. ............. 252/455 R |
| 3,278,421 | 10/1966 | Gatsis ...................... 208/264 |
| 3,288,704 | 11/1966 | O'Hara et al. ............. 208/106 |
| 3,677,971 | 7/1972 | White ...................... 252/455 R |
| 3,826,736 | 7/1974 | Kittrell ...................... 208/59 |
| 3,884,798 | 5/1975 | Hilfman ...................... 208/111 |
| 3,944,503 | 5/1976 | Suto et al. ............. 252/455 R |
| 4,062,809 | 12/1977 | Ward ...................... 252/455 R |
| 4,080,286 | 3/1978 | Yanik et al. ............. 208/216 |
| 4,169,040 | 9/1979 | Bea et al. ............. 208/59 |
| 4,176,089 | 11/1979 | Cull ...................... 252/452 |
| 4,196,101 | 4/1980 | Wilson et al. ............. 252/439 |
| 4,233,183 | 11/1980 | Inaba et al. ............. 252/432 |
| 4,327,188 | 4/1982 | Endo et al. ............. 501/134 |
| 4,482,642 | 11/1984 | Ettlinger et al. ............. 502/232 |
| 4,552,642 | 11/1985 | Hettinger, Jr. ............. 208/10 |
| 4,593,014 | 6/1986 | Halluin et al. ............. 502/242 |

FOREIGN PATENT DOCUMENTS

| 145042 | 6/1985 | European Pat. Off. . |
| 0212422 | 3/1987 | European Pat. Off. . |
| 0002436 | 6/1978 | Japan ...................... 502/242 |
| 1079272 | 8/1967 | United Kingdom . |

OTHER PUBLICATIONS

R. J. Gorte, "Support Effects Studied on Model Supported Catalysts", Symposium on Metal-Support Interactions, American Chemical Society, Miami Beach, 1985, pp. 143-151.

J. Bachelier et al., "Surface Phases in Sulfided Ni-Mo/Al$_2$O$_3$ Catalysts", Journal of Catalysis 87, 1984, pp. 292-304.

Primary Examiner—Patrick P. Garvin
Assistant Examiner—George R. Fourson
Attorney, Agent, or Firm—K. K. Brandes

[57] ABSTRACT

A hydrocracking process comprises the step of contacting a liquid hydrocarbon containing feed with a free hydrogen containing gas and a catalyst composition comprising a silica/titania on alumina support material which has been promoted with compounds of nickel, molybdenum, and preferably, also phosphorus. Preferably, the feed is a vacuum gas oil, and the production of middle distillates is maximized.

19 Claims, No Drawings

HYDROCRACKING CATALYST FOR MIDDLE DISTILLATES

This is a continuation-in-part application of my co-pending application Ser. No. 763,592; filed Aug. 8, 1985, now U.S. Pat. No. 4,720,472.

BACKGROUND OF THE INVENTION

This invention relates generally to hydrocracking. In particular it relates to the hydrocracking of middle distillates. In another embodiment it relates to a catalyst composition. In particular it relates to the use of a catalyst composition for the production of middle distillates.

Strong continuing need and demand for middle distillate oil is being felt in the industry. Heavy distillate oil has been and remains a desirable source of middle distillate oil. However, heavy oils are, in large part, diverted to fuel oils because of the lack of an effective method for converting them to lower boiling products. These oils usually contain significant amounts of nitrogenous hydrocarbon impurities. Thus in addition to hydrocracking, their conversion involves nitrogen removal. Catalyst normally selected for converting middle distillates to gasoline produce large amounts of dry gases, butanes and gasoline when used with heavy distillate feedstocks. Catalysts known in the prior art when used to produced middle distillates either provide good conversion with poor selectivity or good selectivity with poor conversion.

SUMMARY OF THE INVENTION

An object of this invention is to provide an effective and improved hydrocracking process for producing middle distillates from heavy distillate oil. Another object of this invention is to provide a catalyst composition that will provide good conversion and selectivity to middle distillates. Other objects will become clear from the description and examples herein.

According to the instant invention a silica/titania catalyst which has been impregnated onto alumina and then promoted with nickel and molybdenium has shown good conversion and good selectivity for middle distillates in hydrocracking processes.

Also in accordance with the instant invention, a hydrocracking process is provided comprising the step of contacting (A) a substantially liquid hydrocarbon-containing feed, which has an initial boiling point under atmospheric pressure conditions in excess of about 400° F., with (B) a free hydrogen containing gas and (C) a catalyst composition comprising a silica/titania on alumina (i.e., alumina coated with a mixture of silica and titania) support material which has been promoted (preferably by impregnation) with at least one compound of nickel and at least one compound of molybdenium;

under such hydrocracking conditions as to obtain a liquid hydrocarbon-containing product stream having a lower initial boiling point and a higher API[60] gravity (measured at 60° F.) than said hydrocarbon containing feed stream.

Preferably, the hydrocracking catalyst composition also comprises at least one phosphorus compound, more preferably at least one compound containing phosphorus and oxygen (most preferably $H_3PO_4$), which has been added to the catalyst composition together with said compounds of nickel and molybdenum.

DETAILED DESCRIPTION OF THE INVENTION

The first step in the instant invention is to form a silicon/titanium mixture. To prepare the silicon/titanium mixture, suitable compounds of silicon and of titanium, preferably a silicon alkoxide and a titanium alkoxide, are mixed, optionally with an organic diluent. The alkoxide constituent of the tatanium alkoxide and of the silicon alkoxide can be any alkoxide constituent which contains from about 1 to about 20, preferably from about 2 to about 4, carbon atoms per molecule and which is soluble in the liquid reaction medium. Suitable alkoxides include n-butoxide, secondary butoxide, isobutoxide, isopropoxide, n-propoxide, ethoxide and methoxide. The methyl or ethyl esters (alkoxides) of silicon and the isopropyl or butyl esters (alkoxides) of titanium are preferred.

The organic diluent which can be mixed with the titanium alkoxide and the silicon alkoxide can be any aromatic compound such as benzene, toluene and xylene; or paraffin such as hexane, heptane and cyclohexane; a halogenated hydrocarbon such as tetrachloroethylene; ether such as diethyl ether; ketones such as methyl ethyl ketone, acetone, etc; and the like. Preferably the organic solvent which exhibits mutual solubility for the titanium and silicon alkoxides and for water is used as the diluent. More preferably the diluent is an alcohol, most preferably a $C_1$–$C_4$ alcohol, such as methanol, ethanol, normal and isopropanol, normal and isobutanol.

The molar ratio of silicon alkoxide to titanium alkoxide that are mixed together will depend upon the desired ratio of titanium alkoxide and silicon alkoxide in the final composition. Thus the molar ratio of silicon alkoxide to titanium alkoxide can range from about 0.05:1 to about 10:1, preferably from about 1:3 to about 3:1. The presently most preferable molar ratio is about 1:1. The organic diluent mixed with the alkoxides can be added in a range from about 0 to about 90 volume percent, based on the total mixture. The mixture is generally prepared at room temperature and atmospheric pressure.

The thus formed mixture of silicon and titanium compounds is then mixed with a dried alumina and thus impregnated onto the alumina. Once the silicon/titanium compounds have been completely absorbed onto the alumina, the obtained material is then treated with moist air to hydrolyze the silicon and titanium compounds. This process takes place over a period ranging from about 4 to about 24 hours, with the contacting preferably taking place by bubbling air through water and then, passing the moist air through a bed of the silica/titania or alumina material. Generally the amounts of silicon compounds, titanium compounds and alumina are chosen so as to provide from about 75 to about 95 weight percent alumina in the silica/titania on alumina material. The silica to titania ratio can be in the range of from about 0.05:1 to about 10:1, preferably from about 1:3 to about 3:1, and most preferably is about 1:1.

After the hydrolysis of the silicon/titanium compounds, the silica/titania on alumina material is then dried, preferably in the presence of some gas flowing at a rate sufficient to dry the bed in a reasonable length of time at a temperature ranging from about 100° to about 200° F..

The dried silica/titania on alumina material, which may still contain some moieties which have not hydrolyzed, is then calcined. This is preferably done in the presence of an oxiding gas so as to burn off the remaining unhydrolyzed organic materials. However, care should be taken that the material being calcined does not "ignite", resulting in rapid oxidation and high temperatures in some localized area of the bed of silica/titania on alumina. This can be prevented by restricting the flow of oxidizing gas into the bed, and/or diluting the oxidizing gas with an inert gas, and/or raising the temperature of the bed slowly. For example, air may be diluted with nitrogen in a nitrogen:air ratio ranging from 0 to about 5. The calcining temperature can be increased at from about 0.1 to about 5° F. per minute. The final temperature can range from about 800° to about 1500° F. Alternatively, excessive temperatures can be avoided during this calcination by using extremely shallow beds of silica/titania on alumina.

The thus prepared silica/titania on alumina material is then pomoted with compounds of nickel and molybdenum. A solution containing compounds of nickel, molybdenum, and possibly other elements is impregnated onto the silica/titania on alumina material. The thus impregnated material is then calcined, preferably at a temperature ranging from about 500° to about 1500° F. for about 1 to about 20 hours.

Generally, when promoting with nickel and polybdenum, the nickel will be present in the calcined catalyst composition of this invention in the amount of about 0.1 to about 5 weight percent, based on the weight of the catalyst composition, and the molybdenum will be present in an amount of about 1 to about 15 weight percent, also based on the weight of the catalyst composition.

In a preferred embodiment, the catalyst composition of this invention additionally contains at least one phosphorus compound, more preferably at least one compound containing phosphorus and oxygen. Also more preferably, the phosphorus compound is incorporated into the catalyst composition together with compounds of nickel and molybdenum, i.e., the phosphorus compound is preferably present in the impregnating solution comprising compounds of nickel and molybdenum.

Any suitable phosphorus compound which is soluble in the impregnating solution can be employed. Non-limiting examples of suitable phosphorus compounds are: $H_3PO_4$, $H_4P_2O_7$, $(HPO_3)_n$, $NH_4H_2PO_4$, $NaH_2PO$ $KH_2PO_4$, $(NH_4)_2HPO_4$, $Na_2HPO_4$, $K_2HPO_4$, $(NH_4)_3PO_4$, $(NH_4(NH_4)_2H_2P_2O_7$, $(NH_4)_3P_2O_7$, $H_3PO_3$, $NH_4H_2PO_3$, $NaH_2PO_3$, $NH_4HPO_4$ and the like, and mixtures thereof; preferably $H_3PO_4$. Generally the concentration of the phosphorus compound in the impregnating solution and the weight ratio of phosphorus compound to the silica/titania on alumina material are chosen such as to provide a weight percentage of P, based on the calcined catalyst composition of this invention, in the range of from about 0.1 to about 5 weight-% P, preferably from about 0.5 to about 2 weight-% P, more preferably about 1 weight-% P.

In one embodiment, the calcined catalyst composition of this invention is presulfided by the additional step of contacting the calcined catalyst composition with a suitable sulfur compound under such conditions as to at least partially convert the transition metal compounds contained in the calcined catalyst composition to sulfides. This can be accomplished by passing a sulfur-containing gas oil or a solution of carbonyl sulfide (COS) or of at least one mercaptan or of at least one organic sulfide, e.g., dissolved in a hydrocarbon solvent, over the catalyst composition at an elevated temperature (e.g., at 300°-650° F.), generally in the presence of hydrogen gas. Or a gaseous mixture of hydrogen and hydrogen sulfide (preferably, at a volume ratio of about 10:1) can be passed over the catalyst composition at an elevated temperature, preferably about 1-15 hours at about 400° F. and then about 1-15 hours at about 700° F.. This presulfiding step is particularly desirable when the catalyst composition of this invention is used for hydrotreating or hydrocracking of liquid hydrocarbon containing feed streams containing sulfur.

The thus formed catalyst is suitable for use in the recovery of middle distillates after presulfiding the catalyst.

It is generally understood that in this novel catalyst the silica and titania materials provide the acidity for the catalyst where the alumina provides the surface area and pore distribution. Generally, this catalyst will have pores of diameter ranging from about 50 to about 300Å, with a pore volume (measured by mercury intrusion porosimetry) ranging from about 0.3 to about 1:5 cc per gram, and a surface area (measured by the BET/$N_2$ method) ranging from about 50 to about 300 m$^2$/g.

The hydrocracking process of this invention can be carried out with any suitable substantially liquid (i.e., liquid at the hydrocracking conditions) hydrocarbon containing feed which have an initial boiling point in excess of about 400° F. Suitable hydrocarbon containing feeds (also referred to as feed streams) include crude oils, liquid crude oil fractions, liquid petroleum products, liquid coal pyrolyzates, liquid products from extraction and/or liquefaction of coal (including lignite), liquid products from tar sands, shale oil, liquid shale oil fractions, liquid products from shale oil and similar products. The present invention is particularly directed to relatively heavy oil feeds (such as heavy full range crudes, heavy gas oils, vacuum gas oils, heavy cycle oils, residua and other materials) which generally boil in excess of about 500° F. (under atmospheric pressure conditions). A particularly preferred feed is vacuum gas oil, which has an initial boiling point (at atmospheric pressure conditions) of about 650°-800° F. and a distillation end point (at atmospheric pressure conditions) of about 950°-1100° F. Generally the API$^{60}$ gravity (measured at 60° F.) of the hydrocarbon containing feed is in the range of from about 10 to about 30; and the sulfur content is in the range of from about 0.1 to about 3 weight-% S. Generally also small amounts of nitrogn compounds (generally about 0.2 weight-% N or less) and small amounts of metals, in particular Ni and V, (generally about 10 ppmw or less metals) are present in the feed stream.

The free hydrogen containing gas used in the hydrocracking process of this invention can be substantially pure hydrogen gas, or can be mixtures of hydrogen and other gases, such as nitrogen, helium, methane, ethane, carbon monoxide and hydrogen sulfide. At present, substantially pure hydrogen gas is preferred.

The hydrocracking process of this invention employing the catalyst composition of this invention is carried out in any apparatus whereby an intimate contact of the catalyst composition with said hydrocarbon containing feed and a free hydrogen containing gas is achieved, under such conditions as to produce a hydrocarbon-containing product stream having a lower initial boiling point and higher API[60] gravity than the hydrocarbon containing feed stream. Generally lower levels of sulfur, nitrogn and Ramsbottom carbon residue are also attained in this hydrocracking process. The hydrocracking process can be carried out using a fixed catalyst bed (presently preferred) or a fluidized catalyst bed or a moving catalyst bed or an agitated slurry of the catalyst in the oil feed (hydrovisbreaking operation). The hydrocracking process can be carried out as a batch process or, preferably, as a continuous process, more preferably in a tubular reactor containing one or more fixed catalyst beds or in a plurality of fixed bed reactors in parallel or in series. The term "stream" as used herein applies to both batch and continuous operations.

Any suitable reaction time between the catalyst composition, the hydrocarbon containing feed and hydrogen gas can be utilized in the hydrocracking process of this invention. In general, the reaction time will range from about 0.1 hour to about 20 hours. Preferably, the reaction time will range from about 0.2 to about 10 hours. Thus, the flow rate of the hydrocarbon containing feed stream should be such that the time required for the passage of the stream through the reactor (residence time) will be in the range of about 0.1 to about 20 hours preferably about 0.2-10 hours. In a continuous fixed bed operation, this generally requires a liquid hourly space velocity (LHSV) in the range of about 0.05 to about 10 cc of feed per cc of catalyst per hour, preferably from about 0.1 to about 5 cc/cc/hr.

The hydrocracking process employing the catalyst composition of the present invention can be carried out at any suitable temperature. The temperature will generally be in the range of from about 350 to about 900° F., and will preferably be in the range of about 650° to about 800° F.. Temperatures above 900° F. do improve conversion but may cause adverse effects, such as excessive coking. Also, economic considerations will usually be taken into account in selecting the optimal operating temperature.

Any suitable pressure may be utilized in the hydrocracking process of this invention. The reaction pressure will generally be in the range of about atmospheric pressure (0 psig) to up to about 5,000 psig. Preferably, the pressure will be in the range of about 500 to about 3,000 psig. Higher pressures tend to reduce coke formation but operating at high pressure may be undesirable for safety and economic reasons.

Any suitable quantity of hydrogen can be used in the hydrocracking process. The quantity of hydrogen used to contact the hydrocarbon containing feed will generally be in the range of about 500 to about 10,000 standard cubic feet $H_2$ per barrel of the hydrocarbon containing feed, and will more preferably be in the range of about 2,000 to about 6,000 standard cubic feet $H_2$ per barrel of the hydrocarbon containing feed.

The hydrocracked product can be separated into a gas stream (containing unreacted hydrogen gas and other gases, such as hydrogen sulfide and light hydrocarbons which are gaseous at about 25° C./1 atm) and into one or several liquid product streams. Preferably, the liquid hydrocracked products are distilled under such conditions as to attain a gasoline fraction (having a boiling range at atmospheric presure of about 180°-330° F.), a middle distillate fraction (having a boiling range at atmospheric pressure conditions of from about 330° to about 650° F., useful as diesel fuel or heating oil) and a higher boiling fraction. The hydrocracking process is preferably carried out at such hydrocracking conditions as to maximize the production of middle distillates. Generally, the amount of the middle distillate fraction in the product is in the range of 20 to about 60 volume-% of the total liquid product, preferably from about 25 to about 50 volume-%.

After use this catalyst can be regenerated by burning off the "coke" in an oxidizing atmosphere using conventional methods.

The following examples demonstrate the usefulness of this invention, but are not intended to limit the scope of the invention.

EXAMPLE I

This example illustrates the preparation of various promoted hydrocracking catalyst compositions.

Control Catalyst A was a silica/titania catalyst that was promoted with nickel and molybdenum. This catalyst was prepared as follows. First, 16.4 grams of $NiCO_3$, 51.0 grams of $MoO_3$ and 9.8 grams of 85 weight-% $H_3PO_4$ were mixed with about 80 ml of water. This mixture was stirred and heated under reflux conditions for about 4 hours. 168 grams of a clear, green solution were obtained. 1 gram of this solution contained 0.203 grams (0.0021 g-atoms) of Mo, 0.048 grams (0.0008 g-atoms) of Ni and 0.0219 grams (0.0007 g-atoms) of P.

The silica/titania support material of Catalyst A was prepared substantially in accordance with Preparation "A" described in U.S. Pat. No. 4,176,089, hereby incorporated by reference. A mixture of 72 cc of $H_2O$ and 928 cc of isopropanol was placed in a 4-liter flask equipped with stirring bar, thermocouple, condenser and separatory funnel. This mixture was heated to 60°-65° C. A second mixture containing 104 grams of $Si(OC_2H_5)_4$, 170 grams of $Ti(C_4H_9O)_4$ and 500 cc of isopropanol was slowly added through the separatory funnel into the 4-liter flask. This addition of the silicon and titanium compounds required about 3 hours. The entire mixture in the 4-liter flask was heated for one more hour at about 65° C. and then filtered. The filter cake was dried under a 250 watt heat lamp for about 3 days, and then calcined at about 1000° F. for about 16 hours. The powdery material was compacted to ¼" pills, which were crushed into 10/20 mesh granules. The surface area of the support material was 266 m$^2$/g (determined in accordance with the BET/$N_2$ method, ASTM D3037).

9.35 grams of the above-described Ni/Mo/P solution was diluted with water to a total volume of 9.7 cc. This diluted solution was added to 15.64 grams of the above-described silica/titania material under vacuum conditions. The Ni/Mo-impregnated $SiO_2/TiO_2$ catalyst composition was dried under a 250 watt heat lamp for several hours and calcined for 2 hours at 400° F., for 1 hour at 500° F. and for 3 hours at 800° F. in a stream of air. The calcined Catalyst A contained 3.0 weight-% Ni, 12.7 weight-% Mo and 1.0 weight-% P.

Catalyst A was presulfided before use as follows. A heated tube reactor was filled with a 21/2 inch high bottom layer of Alundum (a-alumina having a surface area of less than 1 m$^2$/g), an 11 inch high middle layer of a 70 cc mixture containing 12.5 cc of the catalyst and the balance 36 grit Alundum, and a 5 inch top layer of Alundum. The reactor was purged with nitrogen and the catalyst was heated for one hour in a nitrogen stream to about 400° F. Then the catalyst was exposed to a mixture of hydrogen (10 1/hr) and hydrogen sulfide (1.4 1/hr) for about 14 hours. The catalyst was then heated for about one hour in the mixture of hydrogen and hydrogen sulfide to a temperature of about 700° F. for about 14 hours while the catalyst continued to be exposed to the mixture of hydrogen and hydrogen sulfide. The catalyst was then allowed to cool to ambient temperature conditions in the mixture of hydrogen and hydrogen sulfide and was finally purged with nitrogen.

Control Catalyst B was a Ni/Mo/P mixture of alumina and coprecipitated $SiO_2/TiO_2$. 40 grams of alumina (surface area: 293 m²/g; pore volume: 0.78 cc/g; dried for 16 hours at 350° C.), 7.7 grams of dried silica/titania support material (described above; used for Catalyst A) and some water were mixed with mortar and pestle. Dilute nitric acid was dropwise added to the above wet mixture of $Al_2O_3$ and $SiO_2TiO_2$ until a pH of 3.0 was attained. Grinding with mortar and pestle was continued about 2 hours. Then the mixture was partially dried with a hot air gun while being continuously stirred and ground. The thick paste of the mixture of alumina and silica/titania was dried under a 250 watt heat lamp for several days. The dry mixture was calcined at 1000° F. for about 6 hours under a stream of air.

The calcined mixture of alumina and $SiO_2/TiO_2$ was impregnated under vacuum with the Ni/Mo-containing impregnating solution, dried, calcined and presulfided essentially in accordance with the procedure described for Catalyst A. Calcined Catalyst B contained 1.0 weight-% P, 3.1 weight-% Ni and 13 weight-% Mo.

Invention Catalyst $C_1$ was prepared as follows. 9.4 grams of $Si(C_2H_5O)_4$ and 14.2 grams of $Ti(C_4H_9O)_4$ were mixed and then poured over 40.0 grams of alumina powder (dried at 300° C. for 16 hours). The mixture was thoroughly stirred in a sealed flask. A stream of air (4.0 scf/hr) was bubbled through water and then passed over the above Si/Ti-impregnated alumina material for 16 hours. The Si/Ti-impregnated alumina was calcined in a 1:1 air/nitrogen gas stream for 2 hours at 400° F., 1 hour at 500° F., 3 hours at 800° F. and 1 hour at 1000° F. 25.6 grams of a Ni/Mo impregnating solution, which was essentially the same as the one described in the procedure for making Catalyst A but containing 0.267 g Mo, 0.064 g Ni, 0.021 g P per gram of solution, was diluted with water to a total of 24 cc. The calcined Si/Ti-impregnated alumina was impregnated with this impregnating solution, dried, calcined and presulfided in accordance with the procedure described for Catalyst A. Calcined Catalyst C contained 2.1 weight-% Si, 3.4 weight-% Ti, 2.7 weight-% Ni, 11.4 weight-% Mo, 0.9 weight-% P.

Invention Catalyst $C_2$ was prepared substantially in accordance with the procedure described for Catalyst $C_1$, with the exception that 21.9 grams of $Ti(C_4H_9O)_4$ were used (in lieu of 14.2 g). In addition, the calcined catalyst $C_2$ was presulfided by heating at 204° F. in a nitrogen stream that was saturated with 2-mercaptoethanol vapor. Catalyst $C_2$ contained 2.0 weight-% Si, 5.1 weight-% Ti, 2.6 weight-% Ni, 11.0 weight-% Mo and 0.9 weight-% P.

Invention Catalyst $C_3$ was substantially the same as Catalyst $C_1$ except that it contained more Si and Ti. Calcined Catalyst $C_3$ comprised 4.3 weight-% Si, 7.6 weight-% Ti, 2.4 weight-% Ni, 9.9 weight-% Mo and 0.8 weight-% P.

EXAMPLE II

This example illustrates processes for hydrocracking of a heavy hydrocarbon feedstock. The feed was a vacuum gas oil having an $API_{60}$ gravity of 24.8 containing 0.5 weight-% S and 0.08 weight-% N, and boiling at atmospheric pressure conditions in the range of 65020 -1100° F.. The oil feed and hydrogen gas (3500 scf $H_2$ per barrel oil) were passed through a ¾″ I.D., 22″ long reactor filled with a mixture of 25 cc of one of the catalysts described in Example I and 45 cc of 20/40 mesh inert Alundum alumina (surface area: less than 1 m²/g). The liquid hourly space velocity of the feed was about 0.5 cc/cc hour; the reactor temperature ranged from about 700 to about 800° F.; and the reaction pressure was maintained at about 1400 psig. Reactor effluent streams were cooled, analyzed and fractionated under atmospheric pressure conditions. Pertinent operating parameters and results are summarized in Table I.

TABLE I

| Run | Temp (°F.) | Catalyst | $API^{60}$ of Product | Product Fractions[1] IBP-330 F | 330–650 F | % Conversion of Feed | % Conversion to 330–650 F |
|---|---|---|---|---|---|---|---|
| 1 (Control) | 725 | A | 26.9 | 1.65 | 12.92 | 5.33 | 3.50 |
| 2 (Control) | 725 | B | 33.7 | 8.12 | 29.49 | 30.60 | 21.57 |
| 3 (Invention) | 725 | $C_1$ | 32.4 | 5.02 | 25.49 | 22.80 | 17.22 |
| 4 (Invention) | 725 | $C_2$ | — | 10.37 | 36.51 | 40.4 | 28.77 |
| 5 (Invention) | 725 | $C_3$ | — | 12.5 | 34.9 | 41.4 | 27.5 |
| 6 (Control) | 750 | A | 27.8 | 2.80 | 14.68 | 8.54 | 5.44 |
| 7 (Control) | 750 | B | 34.9 | 9.87 | 34.57 | 38.21 | 27.23 |
| 8 (Invention) | 750 | $C_1$ | 36.1 | 11.3 | 37.3 | 42.9 | 30.4 |
| 9 (Invention) | 750 | $C_2$ | — | 13.76 | 38.45 | 46.39 | 30.96 |
| 10 (Invention) | 750 | $C_3$ | — | 15.4 | 40.4 | 50.7 | 33.6 |
| 11 (Control) | 775 | A | 29.7 | 4.95 | 24.36 | 21.66 | 16.17 |
| 12 (Control) | 775 | B | 37.4 | 15.30 | 41.46 | 51.90 | 34.88 |
| 13 (Invention) | 775 | $C_1$ | 39.8 | 17.81 | 44.62 | 58.26 | 38.47 |
| 14 (Invention) | 775 | $C_2$ | — | 19.80 | 46.04 | 61.67 | 39.46 |

TABLE I-continued

| Run | Temp (°F.) | Catalyst | API⁶⁰ of Product | Product Fractions⁽¹⁾ IBP-330 F | 330-650 F | % Conversion of Feed | % Conversion to 330-650 F |
|---|---|---|---|---|---|---|---|
| 15 (Invention) | 775 | $C_3$ | — | 23.9 | 46.7 | 67.1 | 40.6 |
| 16 (Control) | 800 | A | 33.2 | 12.2 | 34.9 | 41.3 | 27.8 |
| 17 (Control) | 800 | B | 39.8 | 20.38 | 50.24 | 67.32 | 44.65 |
| 18 (Invention) | 800 | $C_1$ | 41.9 | 25.11 | 50.78 | 73.21 | 45.32 |
| 19 (Invention) | 800 | $C_2$ | — | 28.18 | 50.92 | 76.56 | 44.94 |
| 20 (Invention) | 800 | $C_3$ | — | 30.8 | 50.8 | 79.6 | 45.2 |

⁽¹⁾simulated distillation

Data in Table I show that hydrocracking runs employing invention Catalysts $C_1$, $C_2$ and $C_3$ produced more of the valuable 330°-650° F. boiling product, especially at the commercially more feasible temperature range of 750°-800° F. Also, the total conversion of the feed and the conversion of the feed to the 330°-650° F. fraction was higher in runs employing invention catalysts $C_1$, $C_2$ and $C_3$, especially at 750°-800° F.

Reasonable variations, modifications and adaptations for various usages and conditions can be made within the scope of the disclosure and the appended claims, without departing from the scope of this invention.

I claim:

1. A hydrocracking process comprising the step of contacting
   (A) a substantially liquid hydrocarbon containing feed, which has an initial boiling point under atmospheric pressure conditions in excess of about 400° F., with
   (B) a free hydrogen containing gas and
   (C) a catalyst composition comprising a support material consisting essentially of silica/titania on alumina which support material has been promoted with at least one compound of nickel, at least one compound of molybdenum and at least one compound of phosphorus,
   under such hydrocracking conditions as to obtain at least one liquid hydrocarbon-containing product stream having a lower initial boiling point and a higher API⁶⁰ gravity than said hydrocarbon containing feed;
   wherein said catalyst composition contains about 0.1 to about 5 weight percent nickel and about 1 to about 15 weight percent polybdenum.

2. A process in accordance with claim 1 wherein said initial boiling point is in excess of about 500° F.

3. A process in accordance with claim 1 wherein said feed has an API⁶⁰ gravity of about 10-30 and contains about 0.1-3 weight percent sulfur.

4. A process in accordance with claim 1 wherein said feed is a vacuum gas oil having an initial boiling point of about 65020 -800° F. and a distillation end point in the range of about 950-1100° F., both measured at atmospheric pressure conditions.

5. A process in accordance with claim 1 wherein said at least one hydrocarbon containing product stream is a middle distillate having a boiling range under atmospheric conditions of from about 330 to about 650° F.

6. A process in accordance with claim 1 wherein said hydrocracking conditions comprise a temperature in the range of from about 350° to about 900° F., a pressure in the range of from about 0 to about 5,000 psig, and a quantity of added hydrogen in the range of from about 500 to about 10,000 standard cubic feet $H_2$ per barrel of hydrocarbon containing feed.

7. A process in accordance with claim 6 wherein said process is carried out as a continuous process and the flow rate of said hydrocarbon containing feed is in the range of from about 0.05 to about 10 cc feed per cc catalyst per hour.

8. A process in accordance with claim 1 wherein said support material of said catalyst composition contains about 75-95 weight-% alumina, and the molar ratio of silica to titania in said catalyst composition is in the range of from about 0.05:1 to about 10:1.

9. A process in accordance with claim 1 wherein said catalyst compound contains about 0.1-5 weight-% phosphorus.

10. A process in accordance with claim 9 wherein said catalyst compound contains about 1 weight-% phosphorus.

11. A process in accordance with claim 1 wherein said catalyst composition consists essentially of silica/titania on alumina as support, at least one compound of nickel, at least one compound of molybdenum, and at least one phosphorus and oxygen containing compound.

12. A process in accordance with claim 1 wherein said catalyst composition has been prepared by a preparation process comprising the steps of:
   impregnating dried alumina with a mixture of compounds of silicon and of titanium to form a silicon/titanium-impregnated alumina material;
   hydrolyzing said silicon/titanium-impregnated alumina material to form a hydrolyzed silica/titania on alumina composition;
   drying and thereafter calcining said hydrolyzed silica/titania on alumina composition so as to form a calcined composition;
   impregnating said calcined composition with a solution of compounds of nickel, molybdenum and phosphorus to form a nickel/molybdenum/phosphorus-impregnated silica/titania on alumina composition, and
   calcining said nickel/molybdenum/phosphorus-impregnated silica/titania on alumina composition to form a calcined catalyst composition.

13. A process in accordance with claim 12 wherein said compounds of silicon and titanium are silicon alkoxide and titanium alkoxide.

14. A process in accordance with claim 12 wherein said compounds of silicon and titanium are $Si(C_2H_5O)_4$ and $Ti(C_4H_9O)_4$; said compounds of nickel, molybdenum and phosphorus are NiCO$_3$, MoO$_3$ and H$_3$PO$_4$; and said solution contains water as solvent.

15. A process in accordance with claim 12 wherein said preparation process comprises the additional step of presulfiding said calcined catalyst composition.

16. A process in accordance with claim 15 wherein said presulfiding is carried out with a mixture of hydrogen and hydrogen sulfide.

17. A process in accordance with claim 1 wherein said catalyst composition has a pore volume, measured by mercury intrusion porosimetry, of about 0.3–1.5 cc/g, and a surface area, measured by the BET/N$_2$ method, of about 50–300 m$^2$/g.

18. A process in accordance with claim 6, wherein said temperature is in the range of from about 650° to about 800° F., and said pressure is in the range of from 500 to about 3,000 psi.

19. A process in accordance with claim 18, wherein said temperature is about 750°–800° F.

* * * * *

UNITED STATES PATENT AND TRADEMARK OFFICE
CERTIFICATE OF CORRECTION

PATENT NO. :    4,798,666
DATED       :    January 17, 1989
INVENTOR(S) :   Stephen L. Parrott It is certified that error appears in the above-identified patent and that said Letters Patent is hereby corrected as shown below:

Claim 1, line 50, delete "polybdenum" and substitute --- molybdenum --- therefor.

Claim 4, line 58, delete "65020" and substitute --- 650 --- therefor.

Signed and Sealed this

Eleventh Day of July, 1989

Attest:

DONALD J. QUIGG

*Attesting Officer*    Commissioner of Patents and Trademarks